Patented June 12, 1923.

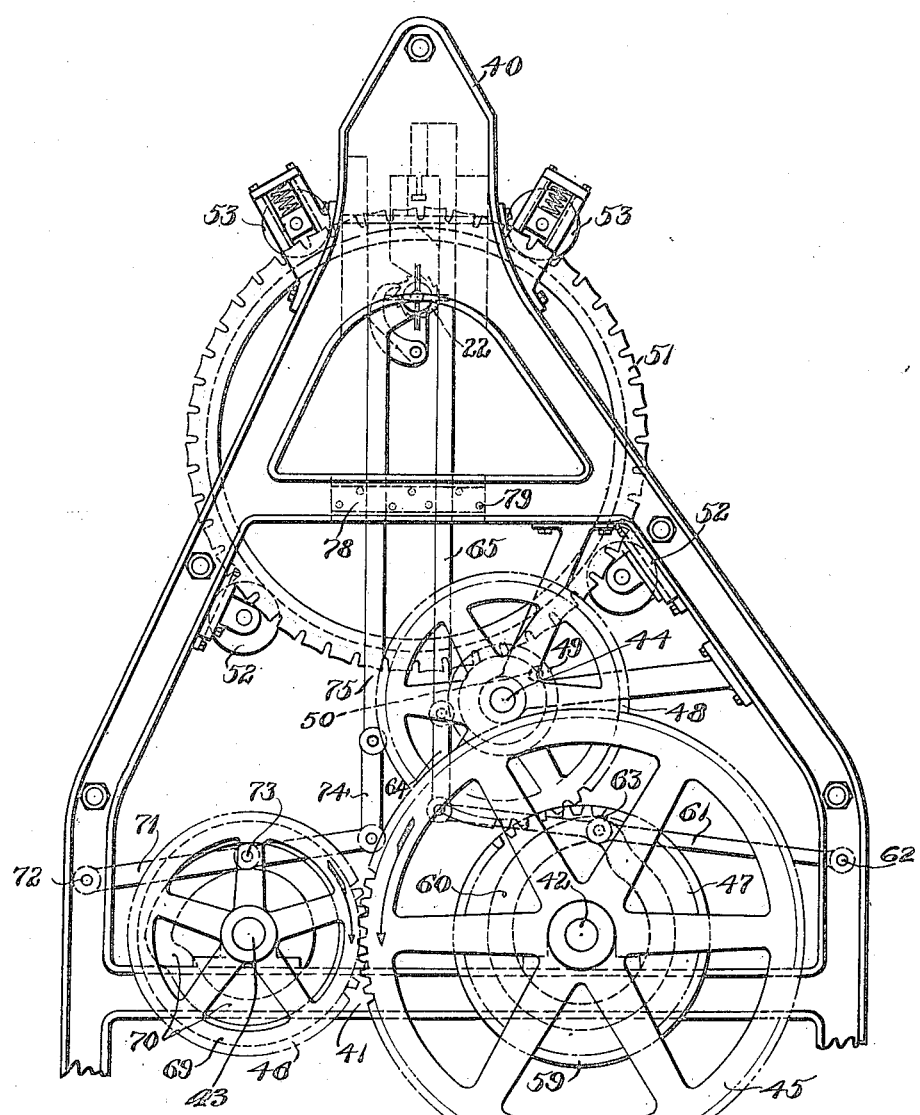

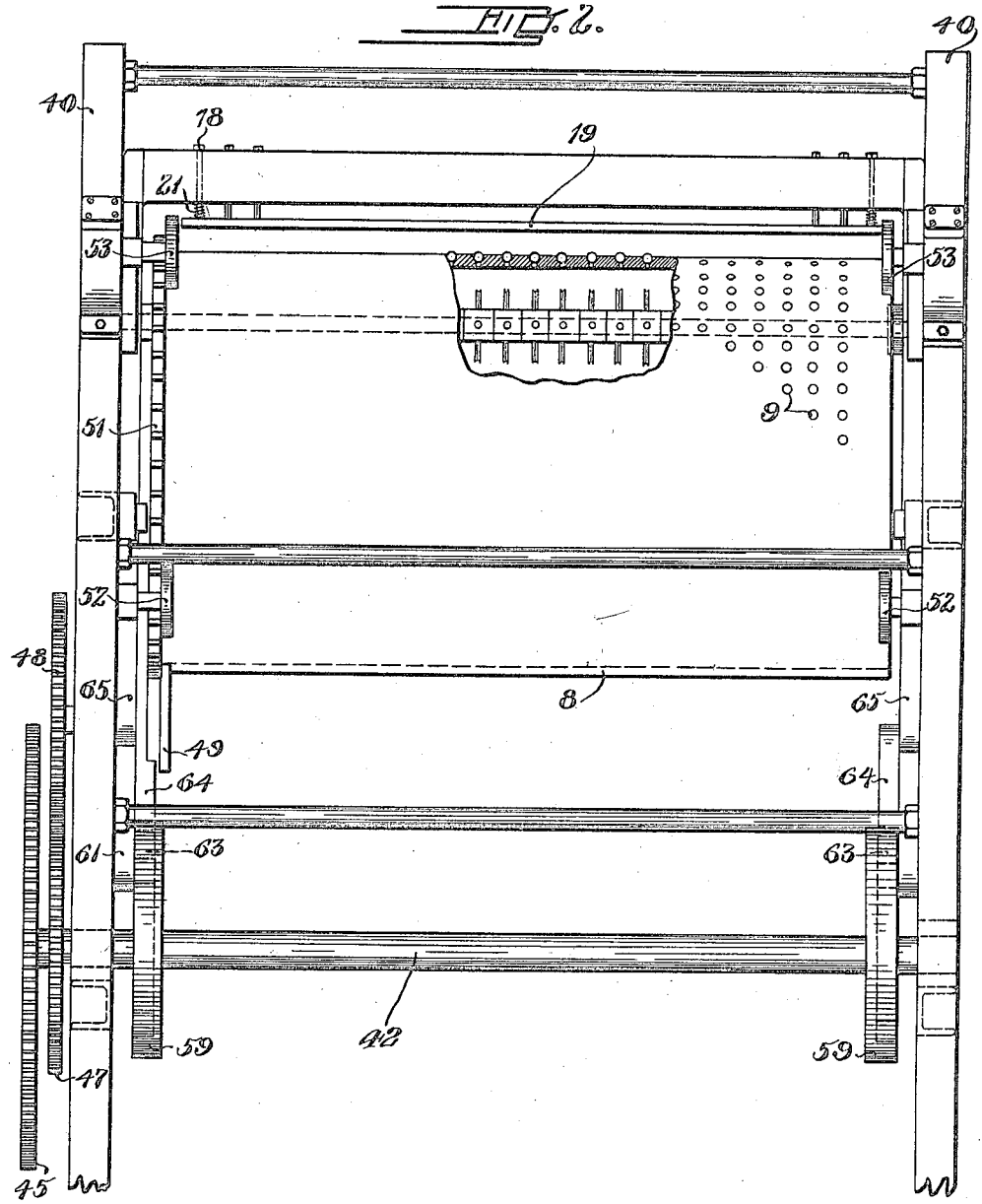

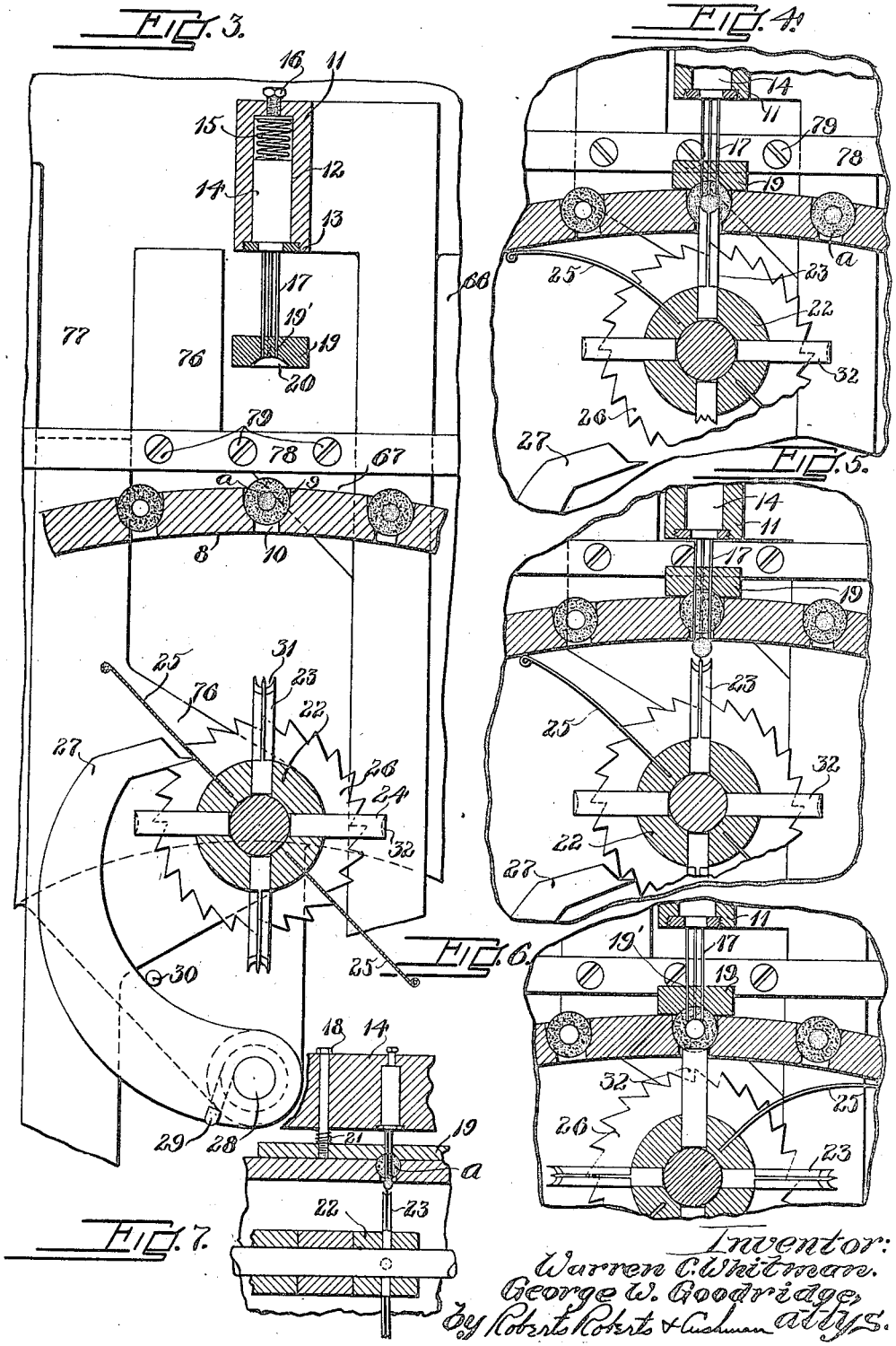

1,458,163

UNITED STATES PATENT OFFICE.

WARREN C. WHITMAN, OF MEDFORD HILLSIDE, AND GEORGE E. GOODRIDGE, OF READING, MASSACHUSETTS, ASSIGNORS TO ATLAS PRODUCTS CO. INC., OF BOSTON, MASSACHUSETTS, A CORPORATION OF MASSACHUSETTS.

FRUIT-PITTING MACHINE.

Application filed August 13, 1921. Serial No. 491,893.

*To all whom it may concern:*

Be it known that we, WARREN C. WHITMAN and GEORGE E. GOODRIDGE, citizens of the United States of America, and residents of Medford Hillside and Reading, respectively, in the county of Middlesex and State of Massachusetts, have invented new and useful Improvements in Fruit-Pitting Machines, of which the following is a specification.

This invention relates to improvements in machines for pitting fruit and particularly for pitting cherries.

The objects of the invention are to pit fruit with a minimum loss of juice and pulp, to restore the pitted fruit to practically its original form and appearance, and in general to improve the quality and the appearance of pitted fruit. More particularly the object is to accomplish the foregoing automatically.

The invention comprises means for cutting or slitting the fruit, forcing the pit out through the cuts, and then pressing the extruded portions of the fruit displaced by the passage of the pits back into position. By precutting the fruit the ejection of the pits is greatly facilitated and the pulp is not compressed with the consequent loss of juice which results when the pits are forced to tear their way through the pulp and the relatively tough outer skin. In the preferred arrangement the precutting blades and the pitting pins enter the cherry from opposite sides and continue to advance until the pit is reached, the precutter quickly drops away and the pitter easily pushes the pit through the slits made by the precutter. As the pitter withdraws, the reshaper presses the extruded portions of the skin and pulp around the slits back into place.

In order to illustrate the invention we have shown one concrete embodiment thereof in the accompanying drawings, in which—

Fig. 1 is an end elevation of a machine involving the features of the invention;

Fig. 2 is a side elevation thereof;

Fig. 3 is an enlarged transverse sectional view of the parts of the machine which pit and reshape the fruit;

Figs. 4, 5 and 6 are sectional views similar to Fig. 3 showing the operative parts of the machine in various positions; and Fig. 7 is a sectional view of the parts shown in Fig. 5 taken at right angles.

The specific embodiment of the invention shown for the purpose of illustration is a cherry pitting machine having a suitable drum 8 (Fig. 2) for receiving the cherries from a suitable source (not shown). The cherries seat in cavities 9 arranged in rows, each cavity having a reduced central hole 10 for the passage of the pit. Arranged above the drum 8 and longitudinally thereof is a reciprocating head 11 provided with bores 12 corresponding in number with the number of cavities in each row, and held in these bores 12 by stop members 13 are plungers 14 pressed against the stop members by springs 15, the tension of which is regulated by screws 16. Extending from the lower reduced end of the plungers are the pitting pins 17, in this case four in number. As shown in Figs. 3 to 6, the tips of the pitting pins are outwardly beveled. Supported below head 11 is bar 19 provided with guide holes 19' for the passage of the pitting pins 17 and with depressions 20 which are adapted to cooperate with cavities 9 to properly center the fruit to be pitted. The guide holes 19' prevent springing, bending and breaking of the pitting pins. This bar 19 is normally held in spaced relation to head 11 by springs 21 upon rods 18 and acts as a stripper for the pitting pins when a pit becomes wedged in them.

Directly below head 11 and within the drum 8 is a spindle 22 suitably mounted for rotation and for vertical reciprocation toward the drum 8. In spindle 22 alternate rows of precutters 23 and reshapers 24 are mounted in such a way that when spindle 22 is vertically reciprocated the precutters or reshapers which are aligned with the cavities immediately above will pass through the holes 10 to contact with the cherries within the cavities.

In the machine here disclosed there are two rows of precutters and two rows of reshapers, each alternate row being disposed at an angle of 90°. Oppositely disposed upon the spindle 22 and midway between the adjacent rows of precutters and reshapers are the flexible wiping members 25 which on rotation of the spindle 22 are adapted to knock off any pit which hangs to the fruit. Upon one end of spindle 22 is arranged a disk 26 provided with ratchet teeth adapted to cooperate with a ratchet 27 mounted upon the pivot 28 attached to the frame of the machine and normally held by spring 29 against the stop pin 30 upon the frame. This ratchet arrangement causes the rotation of the spindle 22 upon its downward stroke at each reciprocation.

The precutters 23 comprise cross-blades 31, the edge of the blades being hollowed to approximately fit the contour of a cherry pit. The reshapers 24 have concave ends 32 which approximately fit the contour of the cherry.

The general structure of the machine will now be described as well as the means for causing the relative motion of the parts which result in the pitting of the fruit. The machine comprises two end members 40 having cross members 41 upon which are supported in suitable bearings shafts 42 and 43. Somewhat above and to the left of shaft 42 is another shaft 44. These shafts are suitably connected by gearing comprising gear wheel 45 on shaft 42 meshing with gear 46 on shaft 43, and gear 47 upon shaft 42 in mesh with gear 48 upon shaft 44. The gears are of such size that shaft 43 is driven at twice the speed of shaft 42, and shaft 44 at the same speed as shaft 42. Upon shaft 44 is a disk or wheel 49 having a pin 50 cooperating with the slotted disk 51 upon drum 8, the pin wheel and slotted disk together forming a Geneva movement for intermittently stepping drum 8 which is supported in frames 40 by adjustable rollers 52 contacting the periphery of the drum from below and spring pressed rollers 53 mounted upon frame members 40 and contacting the periphery of the drum 8 from above. By this arrangement the drum is rotated one step corresponding to the distance between two adjacent rows of cavities 9 upon the drum at each rotation of shaft 42.

The mechanism for vertically reciprocating head 11 for pitting the cherries comprises cam disks 59 having cam grooves 60 at either end of shaft 42 within the frame members 40, levers 61 pivoted at 62 to the frame members 40 and operated by rollers 63 in cam grooves 60, links 64 pivoted to the end of lever 61, and slides 65 attached to the head 11. Slide 65 operates in guideways defined by the raised portions 66 and 67 of the frame members. The mechanism for vertically reciprocating the spindle 22 comprises cam disks 69 having cam slots 70 upon either end of shaft 43 within the frame members 40, the levers 71 pivoted at 72 to the frame members having rollers 73 in the cam slots 70, links 74 pivotally attached to the end of levers 71, and slides 75 which have bearings in projecting portions 76 for the ends of the spindle 22. The slide 75 operates in guideways defined by the projecting portions 76 and 77 of the frame members. The slides 65 and 75 are held in place by plates 78 fastened to the frame members by bolts 79.

The operation of the device is as follows, reference being had to Figs. 3 to 6 in which the various stages of the operation are clearly shown. As previously indicated, the cavities of the drum 8 are filled with cherries to be pitted as the same rotates. In Fig. 3 the head 11 and the spindle 22 are in retracted positions and cherries $a$ are disposed in the cavities 9 in the direct line between the pitting head 11 and the precutters 23 on the spindle 22. Through action of cams 60 and 70 head 11 and spindle 22 are simultaneously actuated toward the cherries $a$. The centering head 19 first comes in contact with the upper surface of drum 8 and through the action of the depressions 20 properly centers the cherries and holds them firmly in centered position. The pitting pins 17 passing through the guide holes 19' in the centering bar 19 pierce the skin of the cherry upon the upper side at the same time that the cherry is being pierced by the blades 31 of the precutters 23 from below. The movement of the spindle 22 and the head 11 toward each other is continued until they reach the position shown in Fig. 4 in which both the pitting pins and the precutting blades contact with the pit of the cherry. At this point the yieldable mounting for the pitting pins comprising plungers 14 and springs 15 comes into play when the pit is unusually large and prevents the pitting pins from being broken. The spindle 22 now quickly drops away to the position shown in Fig. 5, and the head 11 continues to descend forcing the pitting pins downward and ejecting the pit from the cherry through the hole 10. As the spindle moves downward withdrawing the precutters the ratchet 27, which was displaced on the upward movement of the spindle 22, contacts with one of the ratchet teeth of the disk 26 on the lower side and causes a 90° rotation of the spindle 22, bringing reshapers 32 into operation position, the flexible wiping member 25 meanwhile brushing aside the ejected pit. As the head 11 is retracted, the spindle 22 again moves forward, the reshapers 24 pass through holes 10 and contact with the lower portion of the cherry, pressing back the extruded portions of the skin and pulp which were pressed outwardly by the passage of the pit thus reshaping the cherry. The position of the parts at this point in the operation of the device is shown in Fig. 6. When the spindle 22 again retracts it is again rotated through 90° by the action of ratchet 27 and another row of precutters is brought into operative position. Meanwhile the head 11 has retracted withdrawing the pitting pins 17 and the centering bar 19. The drum 8 is then rotated one step by the Geneva movement and the parts are again in the position shown in Fig. 3, ready for a repetition of the operation.

Bar 19 has several important functions; for example it centers the fruit, it acts as a guide for the individual pitting pins, preventing them from spreading, bending and breaking, and it acts as a stripper when a pit becomes wedged in the pitting pins. The breaking of the pitting pins, pits and precutters is also guarded against by the resilient mounting of the pitters.

An important feature of the invention consists in the arrangement of the precutters relatively to the fruit holding means, etc., so that the fruit is slitted radially, diametrically or otherwise transversely of the pit along the path of the pit in its ejection, whereby the pit may be ejected with a minimum loss of juice and substantially no loss of meat. By arranging the precutting blades to radiate from the center line of the fruit outwardly in directions which are opposite, as shown in the drawings, the fruit is slit in diametrical planes; and this is believed to be the best arrangement, especially for cherries.

With slight alterations the machine can be adapted to pit fruit arranged upon a horizontal receiving member such as a rotating table or endless belt. The various steps such as precutting, pitting and reshaping can likewise be arranged to be performed upon the fruit at different stations rather than at the one station as shown in the drawing without departing from the spirit or the scope of the invention.

Means for removing the pits and the pitted fruit have not been shown since they form no part of the invention.

We claim:

1. A fruit pitting machine comprising means for holding fruit to be pitted, means for centering the fruit in the holding means, means for slitting the fruit for the ejection of the pits, means for forcing the pits through the slits, means for brushing aside the ejected pits, and means for reshaping the pitted fruit, whereby fruit is pitted with a minimum loss of juice and pulp.

2. A fruit pitting machine comprising a support having fruit-holding cavities provided with holes for the ejection of the pits, means for holding the fruit in the cavities, means for making slits in the fruit, yieldably mounted pitting means having pins passing through guide holes in the holding means for forcing the pits out through the slits, and means for reshaping the pitted fruit.

3. A fruit pitting machine comprising means for holding the fruit, a cutter comprising crossed concave blades for slitting the fruit preparatory to the ejection of the pit, and means disposed at the opposite side of the fruit for holding the latter against the thrust of the cutter.

4. A fruit pitting machine comprising means for holding fruit, means for slitting the fruit, means for forcing the pit out through the slit, and means for pressing the slitted portion of the fruit back into place, thus reshaping the fruit.

5. A fruit pitting machine comprising means for holding the fruit, means for slitting the fruit preparatory to the ejection of the pit, and means for ejecting the pit, said slitting means and said pit ejecting means being oppositely disposed relative to the fruit.

6. A fruit pitting machine having receiving means for fruit, a cutter for slitting the fruit, and means oppositely disposed relative to the fruit for holding and centering the fruit while it is being slitted.

7. A fruit pitting machine having means for slitting the fruit, pitters, and means for centering the fruit and for guiding said pitters in forcing the pit through the slit.

8. A fruit pitting machine having means for holding fruit to be pitted, said means having cavities for the fruit with holes therethrough for the ejection of the pits, pitters, means for brushing aside the ejected pits, means for reshaping the pitted fruit, centering devices for properly positioning the fruit in the cavities, and holes in the centering devices for guiding the pitters.

9. A fruit pitting machine having means for pitting the fruit and means for reshaping the fruit after the pitting process is completed.

10. A fruit pitting machine having means for pitting the fruit, means for reshaping the fruit after the pitting process is completed, and means for holding the fruit against the thrust of the reshaping means.

11. A fruit pitting machine having means for slitting the fruit preparatory to ejecting the pit, and means for pressing back into place the slitted portions of the fruit after the removal of the pit therethrough, whereby the pitted fruit is reshaped.

12. A fruit pitting machine having means for slitting the fruit preparatory to ejecting the pit, and a reshaper having a concave end for pressing back into place the slitted portions of the fruit after the removal of the pit therethrough, whereby the pitted fruit is reshaped.

13. A fruit pitting machine comprising means for holding the fruit, means for slitting the fruit preparatory to the ejection of the pit mounted upon one side of said holding means, and means for ejecting the pit mounted upon the opposite side of said holding means.

14. A fruit pitting machine comprising means for holding the fruit, a cutter adapted to slit the fruit, preparatory to the ejection of the pit mounted upon one side of said holding means, a pitter mounted upon the opposite side, means for concomitantly advancing said cutter and said pitter substantially to opposite sides of the pit and for causing said cutter to retract whereby the pitter may further advance and eject the pit through the slit made by the cutter.

15. A fruit pitting machine comprising a holder having fruit-holding recesses therein, a reciprocating head on one side of said holder, a plurality of pitters mounted on said head in alinement with said recesses, a reciprocating spindle on the other side of said holder, rows of precutters and reshapers mounted on said spindle in the transverse planes of said recesses, and means for rotating said spindle alternately to bring the precutters and the reshapers into alinement with said recesses.

16. A fruit pitting machine comprising a holder having fruit-holding cavities provided with holes for the ejection of the pits, a reciprocating head, a plurality of pitters yieldably mounted thereon, a bar yieldably mounted below the head having depressions therein coacting with the cavities in the receiving means for centering the fruit, said bar having holes for guiding the pitters, a reciprocable and rotatable spindle mounted beneath the holder, alternate rows of precutters and reshapers mounted thereon, said precutters and reshapers being arranged to pass through the holes in the fruit receiving cavities when the spindle is reciprocated, and means for reciprocating the spindle twice to each reciprocation of the head and for partially rotating the spindle after each reciprocation whereby the fruit is cut before the pit is forced therethrough and the fruit is restored to its original shape after the pitting operation.

17. A fruit pitting machine comprising means for holding the fruit, means for slitting the fruit preparatory to the ejection of the pit, and means for pushing the pit out through the slit.

18. A fruit pitting machine comprising means for holding the fruit, means for slitting the fruit on one side, and means entering the fruit from the other side to eject the pit.

19. A fruit pitting machine comprising means for holding the fruit, a blade reciprocatable toward and from the fruit for slitting one side thereof, and means for pushing the pit out through the slit.

20. A fruit pitting machine comprising means for holding the fruit, means for slitting the fruit preparatory to the ejection of the pit, and a pin pusher reciprocatable to and from the fruit from the opposite side adapted to pierce the fruit and push the pit through said slit.

21. A fruit pitting machine comprising means for holding the fruit, a blade reciprocable toward and from the fruit for slitting one side thereof, and a pin pusher reciprocable to and from the fruit from the opposite side adapted to pierce the fruit and push the pit through said slit.

22. A fruit pitting machine comprising a holder having fruit-holding cavities with holes for the ejection of the pits, a reciprocating head, a plurality of pitters mounted thereon, and a bar resiliently supported by said head for contacting the fruit in advance of the pitters to properly center the fruit, said bar having holes for guiding the pitters.

23. A fruit pitting machine having a pitter comprising a plurality of pitting pins grouped together to pierce the same fruit, means for reciprocating the pitter to project the free ends of the pins into the fruit, and means for individually guiding the pins near their free ends, said means being arranged to contact with the fruit in advance of the pitter and to hold the fruit in position while being pitted.

24. A fruit pitting machine having a series of pitters each pitter comprising a plurality of pitting pins, and guide means for said pitters comprising a bar having a hole for each individual pin, said bar having recesses in the region of its holes to center the fruit.

25. A fruit pitting machine having a reciprocating head, pitters mounted on said head each pitter comprising a plurality of pitting pins, grouped together to pierce the same fruit, guide means for said pitters comprising a bar having a hole for each individual pin, and means for advancing the said bar into juxtaposition with the fruit simultaneously with the advancement of the pitters, said bar being arranged to contact with the fruit in advance of the pitters.

26. A fruit pitting machine comprising means for slitting the fruit, oppositely disposed means for pushing the pit through the slit, and a yielding mount for one of said means.

27. A fruit pitting machine comprising oppositely disposed means for slitting and ejecting the pit, and a spring pressed support for one of said means whereby breaking of either of said means or of the pit is prevented.

28. A fruit pitting machine comprising means for slitting the fruit, oppositely disposed means for pushing the pit through the slit, a yielding mount for one of said means, and means for concomitantly advancing said means toward each other until they contact the pit.

29. A fruit pitting machine comprising a pair of oppositely disposed members for slitting the fruit and ejecting the pit through the slit, a spring pressed support for one of said members whereby breaking of either of said members or of the pit is prevented, and means for concomitantly advancing said members toward each other until they contact the pit.

30. A fruit pitting machine comprising means for slitting the fruit across one side, and means for ejecting the pit through the slit, said means being arranged on opposite sides of the fruit and constructed to remove the pit without cutting away substantially any of the fruit.

31. A fruit pitting machine comprising means for slitting one side of the fruit substantially radially and means oppositely disposed relatively to the fruit for holding and centering the fruit while it is being slitted.

32. A fruit pitting machine having means for slitting the fruit substantially radially, pitters, and means for centering the fruit and for guiding said pitters in forcing the pit through the slit.

33. A fruit pitting machine comprising means for holding the fruit, means for radially slitting the fruit preparatory to the ejection of the pit mounted upon one side of said holding means, and means for ejecting the pit through the slit mounted upon the opposite side of said holding means.

34. A fruit pitting machine comprising means for holding the fruit, means for slitting the fruit transversely of the pit, and means for pushing the pit out through the slit.

35. A fruit pitting machine comprising means for holding the fruit, means for slitting one side of the fruit radially in a plurality of directions, and means entering the fruit from the other side to eject the pit.

36. A fruit pitting machine comprising means for holding the fruit, a blade reciprocatable toward and from the fruit along a path intersecting the pit for slitting one side thereof, and means for pushing the pit out through the slit.

37. A fruit pitting machine comprising means for holding the fruit, means for slitting one side of the fruit substantially in a diametrical plane, and means for pushing the pit through the slit.

38. A fruit pitting machine comprising fruit holding means, a movable pitting head having a plurality of pitters, a bar resiliently supported on said head and in spaced relation thereto and having guide openings for said pitters, and means for moving said head toward said holding means to pit the fruit, said bar being arranged to contact with the fruit in advance of the pitters and to press thereagainst during the pitting operation.

39. A fruit pitting machine comprising fruit holding means, a movable pitting head in spaced relation thereto, having a plurality of pitting members, a bar interposed between said means and said head, and means including springs for normally retaining said bar in spaced relation to said head, said bar being arranged to guide said pitting members and to center the fruit in said holding means in advance of said members.

Signed by us at Boston, Massachusetts, this ninth day of August, 1921.

WARREN C. WHITMAN,
GEORGE E. GOODRIDGE.